UNITED STATES PATENT OFFICE.

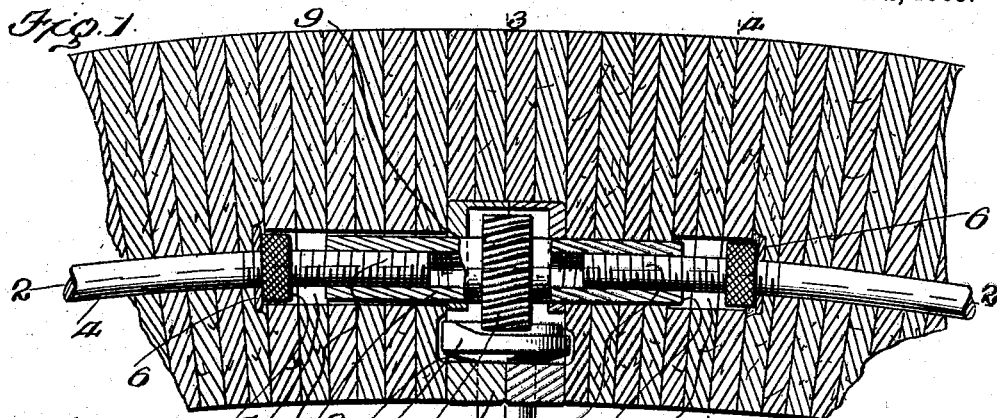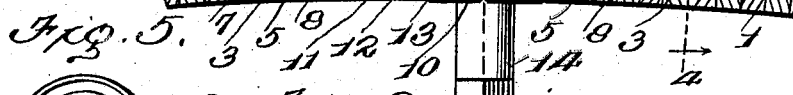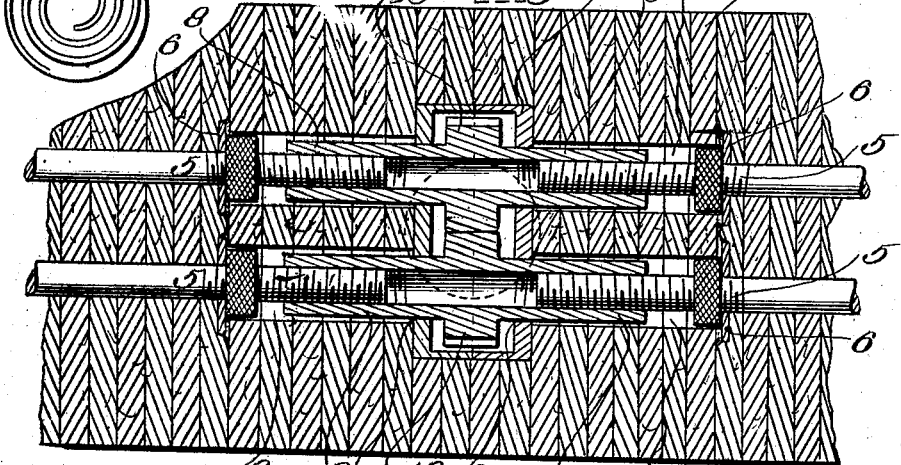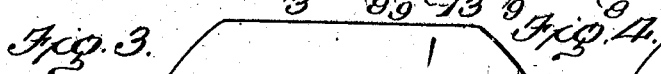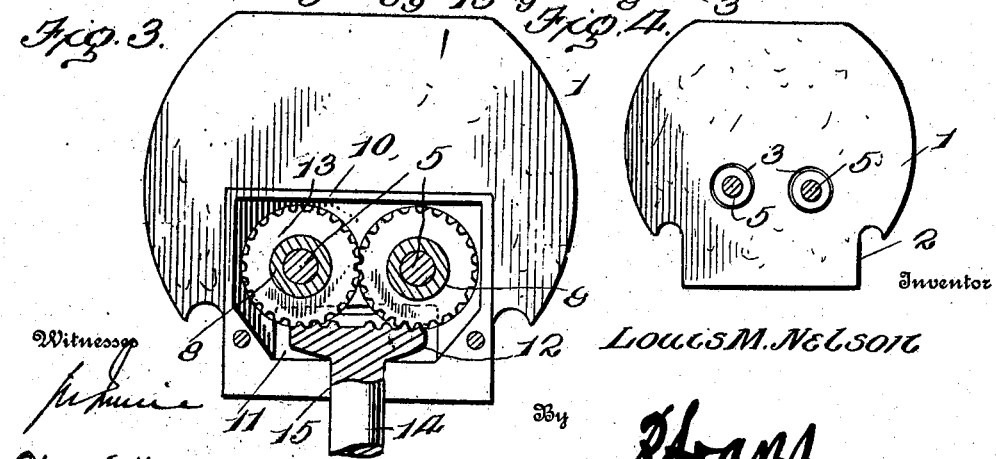

LOUIS M. NELSON, OF DOUGLAS, WYOMING.

TIRE.

No. 911,257.  Specification of Letters Patent.  Patented Feb. 2, 1909.

Application filed August 5, 1908. Serial No. 447,110.

*To all whom it may concern:*

Be it known that I, LOUIS M. NELSON, a citizen of the United States, residing at Douglas, in the county of Converse and State of Wyoming, have invented certain new and useful Improvements in Tires, of which the following is a specification.

This invention comprehends certain new and useful improvements in tires for the wheels of vehicles, particularly automobiles and automobile trucks, and the invention has for its object a novel construction of tire which will embody to a marked degree the characteristics of simplicity, durability, and the capability of withstanding hard usage, especially with heavy vehicles and over heavy roads that have such an injurious abrasive effect on the ordinary rubber tires of the cushion and pneumatic type; the invention at the same time providing a tire which will possess substantially the same resiliency as such rubber tires.

With this and other objects in view as will more fully appear as the description proceeds, the invention consists in certain features of construction and arrangement and combinations of the parts that I shall hereinafter fully describe and claim.

For a full understanding of the invention, reference is to be had to the following description and accompanying drawings, in which:

Figure 1 is a longitudinal sectional view of a tire constructed in accordance with my invention; Fig. 2 is a horizontal sectional view on the line 2—2 of Fig. 1; Fig. 3 is a transverse sectional view on the line 3—3 of Fig. 1; Fig. 4 is a similar view on a reduced scale, the section being taken on the line 4—4 of Fig. 1; Fig. 5 is a detail view of the worm.

Corresponding and like parts are referred to in the following description and indicated in all the views of the drawings by the same reference characters.

The body portion of my improved tire is preferably composed of a plurality of sections 1 of leather or some equivalent substance or material that is capable of resisting the abrasive action incidental to the use of vehicle wheels, said sections being arranged in abutting relation to each other, face to face, the faces tapering toward one end to a sufficient extent to produce a circular series of the predetermined diameter. The inner ends of the sections may be reduced as indicated at 2 for locking engagement with the side flanges of the ordinary channeled rim, or the sections may be otherwise formed, in any desired way to adapt the invention to a wheel rim of any character, as this of itself forms no part of my present invention.

The sections 1 are formed with one or more apertures extending therethrough, said apertures being two in number in the present instance (designated 3), and arranged in transverse alinement with each other. These apertures collectively produce two substantially continuous bores extending circumferentially with respect to the completed tire.

Binding or tie wires 4 are accommodated in the respective bores above mentioned, and the contiguous or adjoining ends of both wires are preferably located at the same point in the circle of the tire, the two ends of each wire being oppositely threaded as indicated at 5.

Washers 6 are slipped over the threaded ends of the tie wires and are held thereon by jam nuts 7 as shown against sundry of the sections 1 of the body portion of the tire, and the sections intermediate of the sections against which the washers 6 abut are formed with somewhat larger apertures to produce bores for the reception of internally threaded coupling sleeves 8, formed with threads corresponding to the right and left hand threads of the ends of the tie wires, with which they engage.

The sleeves 8 are mounted to turn in openings 9 formed in a casing 10 which is mounted within the tire, the surrounding sections 1 being cut out to receive it; and said casing is further formed with a transversely extending slot 11 which accommodates a head 12 formed with a worm as shown, said worm engaging worm gears 13 formed on or secured to the respective coupling sleeves 8. The head 12 is formed on one end of a spindle 14 which is journaled in a radially extending opening 15 formed in the inner side of the casing 10. By this means it is obvious that when the spindle 14 is turned through the instrumentality of any wrench or other suitable tool, the coupling sleeves 8 will be rotated, and the tie wires 4 may thus be held under the requisite tension to maintain the requisite integrity of the tire and to hold the sections in proper abutting relation one with the other.

From the foregoing description in connection with the accompanying drawings, it will be seen that I have provided a very simple and efficient construction of automobile tire which cannot become rim cut or rut cut in use, which will be resilient or yield sufficiently to absorb all of the ordinary shocks that are incidental to the use of motor-driven vehicles, and which is composed of a plurality of extremely tough sections that may be easily formed and readily assembled. Furthermore it is to be noted that any one or more sections may be detached and replaced or have others substituted for them without impairing the efficiency of the tire, although it is to be understood that I do not contemplate the necessity for such replacement or substitution as it is manifest that the inherent integral or one-piece construction of the several sections and the material or substance (leather) out of which the sections are preferably composed will enable the sections to successfully withstand or resist the abrasion between a road surface and the tread and side portions of the tire, the latter in particular, which has been found so fatal to pneumatic tires.

It is to be understood that the body portion of my tire is complete in the sections 1, without any envelop or cover, the same not being necessary owing to the character of the substance out of which the sections are formed.

Having thus described the invention, what is claimed as new is:—

1. The herein described tire, comprising a body portion formed with circumferentially extending bores, tie wires accommodated in said bores and formed with oppositely threaded extremities, coupling sleeves having threaded engagement with said threaded extremities, a casing mounted in the body of the tire, the sleeves being mounted to rotate in said casing and provided with worm gears, a worm mounted in said casing and meshing with said worm gears, and means for turning said worm.

2. The herein described tire, comprising a body portion, tie wires embedded therein and formed with oppositely threaded extremities, coupling sleeves formed with internal threads engaging said threaded extremities, a casing mounted within the body portion of the tire, a spindle journaled in said casing and provided with a head, said head being formed with a worm, and worm gears mounted upon and movable with the coupling sleeves and meshing with said worm.

3. The herein described tire, comprising a body portion, a tie wire embedded therein and formed with oppositely threaded extremities, a coupling sleeve formed with internal threads engaging the said threaded extremities, a casing embedded in the body portion of the tire and in which the coupling sleeve is mounted to rotate, said casing being formed with a transverse slot, a worm mounted in said slot, the coupling sleeve being provided with a worm gear with which said worm meshes, the casing being further formed with an inwardly facing opening leading to said slot, and a radially extending spindle journaled in said opening and secured to said worm to turn the same.

4. The herein described tire, comprising a body portion, tie wires embedded in said body portion and formed with oppositely threaded extremities, washers slipped over said extremities, jam nuts abutting against said washers, internally threaded coupling sleeves engaging the threaded extremities of the tie wires, a casing embedded in the body portion of the tire and in which said coupling sleeves are mounted to rotate, said sleeves being provided with worm gears, a worm mounted in said casing and meshing with said worm gears to turn the sleeves, and means for turning said worm.

In testimony whereof I affix my signature in presence of two witnesses.

LOUIS M. NELSON. [L. S.]

Witnesses:
B. J. ERWIN,
W. J. MORSCH.